(No Model.)

J. B. SWEETLAND.
TROUSERS STRETCHER.

No. 548,476. Patented Oct. 22, 1895.

Witnesses

Inventor
Jerome B. Sweetland
By Alexander Davis
Attorneys

United States Patent Office.

JEROME B. SWEETLAND, OF PONTIAC, MICHIGAN, ASSIGNOR OF ONE-HALF TO FREDERICK W. DURRANT, OF SAME PLACE.

TROUSERS-STRETCHER.

SPECIFICATION forming part of Letters Patent No. 548,476, dated October 22, 1895.

Application filed September 6, 1895. Serial No. 561,700. (No model.)

*To all whom it may concern:*

Be it known that I, JEROME B. SWEETLAND, a citizen of the United States, residing at Pontiac, in the State of Michigan, have invented certain new and useful Improvements in Trousers-Stretchers, of which the following is a specification, reference being had therein to the accompanying drawings.

Figure 1:
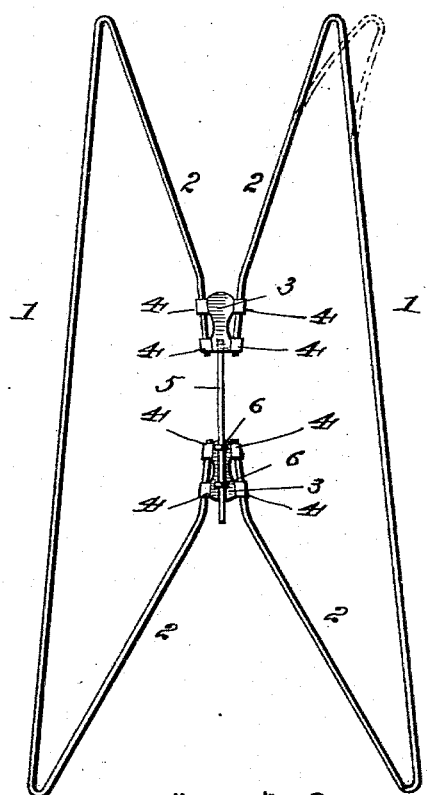
Figure 2:
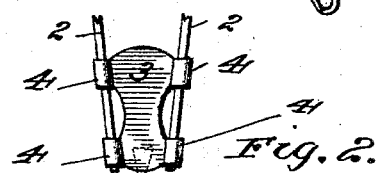
Figure 2:
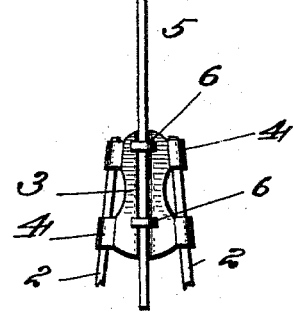

In the drawings, Figure 1 is a plan view of my stretcher complete, and Fig. 2 a detail view showing more clearly the manner of connecting and guiding the inner ends of the springs.

This invention relates to that class of trousers-leg stretchers composed of a spring-frame adapted to be inserted in the leg and to spread outwardly and thereby hold the leg in a taut condition; and the object of the present invention consists of certain novel features of construction, whereby the longitudinal centers of the spring portions of the stretcher shall be kept in alignment while being contracted and expanded.

The frame of the stretcher has the same general form that is usual in this class of stretchers—that is to say, is composed of two side bars 1, inclined slightly toward each other toward one end of the frame and having their respective ends bent over and turned inwardly toward the center of the frame to form the spring portions 2, which serve to normally spread the side bars. The inner ends of each pair of spring-arms 2 are connected rigidly together by means of a cast-metal plate 3, the ends of the wires being preferably secured by being fitted tightly in ears 4, formed on the side edges of the plates. The two plates are connected together by a central longitudinal rod 5, which is rigidly secured at one end to one of the plates and is slidingly attached to the opposite plate in any suitable way, preferably by being passed through eyes 6, formed on or secured to the plate. It will thus be seen that the spring-frame is composed of two wire-sections having their adjacent ends rigidly connected and that the ends of the spring-arms will be kept in alignment by means of the sliding central rod, thereby obviating the tendency of the springs to wabble or oscillate during compression and expansion.

As shown in dotted lines at the upper right-hand corner of Fig. 1, the upper corner of the frame may be slightly curved outward, if desired.

The difficulty heretofore with this class of stretchers has been that the inwardly-extending spring portions have not been provided with any means for preventing them being distorted out of alignment while the frame was being inserted in or removed from the trousers-leg, whereby the device was rendered unnecessarily difficult of insertion and removal, as the wabbling of the two spring portions caused the side-bars to bind during the act of inserting or removing the device. This objection is overcome by the extensible guiding connection between the inner ends of the spring portions, whereby the device may be inserted and removed with greater facility.

Having thus fully described my invention, what I claim is—

1. In a trousers stretcher, a spring-frame comprising the side bars and the inwardly converging spring arms, a longitudinal central rod connecting the inner ends of the opposite spring-arms, the connection at one end of the rod being a slidable one, substantially as described.

2. In a trousers stretcher, the combination of the side bars and the inwardly turned spring-arms terminating near the center of the frame, and a central longitudinal extensible guide connecting the opposite pairs of spring-arms and adapted to hold them in approximate alignment, substantially as described.

3. In a trousers stretcher, the combination of a frame, comprising the side bars 1 and the inwardly turned spring arms 2, plates rigidly connecting the inner ends of each pair of spring arms, and a central longitudinal rod connecting the two plates, the connection at one end of the rod being a slidable one, substantially as described.

In testimony whereof I affix my signature in presence of two witnesses.

JEROME B. SWEETLAND.

Witnesses:
JUNIUS TEN EYCK,
JOHN B. MATHEWS.